(12) United States Patent
Shinozaki et al.

(10) Patent No.: US 6,687,512 B1
(45) Date of Patent: Feb. 3, 2004

(54) SUBSCRIBER TERMINAL, BASE STATION, CIRCUIT MODE SWITCHING METHOD, AND A WIRELESS SYSTEM UTILIZING SAID METHOD

(75) Inventors: Masayuki Shinozaki, Kawasaki (JP); Yutaka Hamada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 314 days.

(21) Appl. No.: 09/590,616

(22) Filed: Jun. 8, 2000

(30) Foreign Application Priority Data

Aug. 9, 1999 (JP) ............................................ 11-225289

(51) Int. Cl.⁷ ................................................ H04B 1/38
(52) U.S. Cl. ...................... 455/557; 455/3.05; 455/561; 375/222
(58) Field of Search ............................... 455/557, 3.05, 455/425, 517, 553, 556, 560, 561; 375/219, 222; 379/93.05, 93.07, 100.01, 100.12, 100.13, 100.17

(56) References Cited

U.S. PATENT DOCUMENTS 5,487,175 A * 1/1996 Bayley et al. ............... 455/557
6,181,953 B1 * 1/2001 Shirota et al. ............... 455/557

FOREIGN PATENT DOCUMENTS

JP            9-233100          9/1997

* cited by examiner

*Primary Examiner*—Lee Nguyen
(74) *Attorney, Agent, or Firm*—Katten Muchin Zavis Rosenman

(57) ABSTRACT

A wireless system that can switch the communication mode based on the type of a signal inputted into the system is provided. The wireless system comprises a subscriber terminal that is connected to devices which output audio signals or data signals and switches the signal path between an audio signal path and a data signal path based on the type of a signal inputted from the devices, and a base station that switches the signal path between an audio signal path and a data signal path based on the type of a signal inputted from a general public line network. The subscriber terminal and the base station are wirelessly connected.

10 Claims, 17 Drawing Sheets

SUBSCRIBER TERMINAL, BASE STATION, CIRCUIT MODE SWITCHING METHOD, AND A WIRELESS SYSTEM UTILIZING SAID METHOD

BACKGROUND OF THE INVENTION

1. Field of the Invention

The present invention generally relates to a subscriber terminal, a base station, a mode switching method, and a wireless system utilizing said method. More particularly, the present invention relates to a subscriber terminal, a base station, a mode switching method, and a wireless system utilizing said method, in which circuit modes are switched.

2. Description of the Related Art

In recent years, a WLL (Wireless Local Loop) has been attracting more and more attention as a wireless subscriber line that is rigidly fixed. Compared with a wired system, a system utilizing the WLL requires neither a large investment nor a long period of time, and is capable of setting a subscriber line in any place where there is a demand in a short period of time at a lower cost. Also, it is possible to establish a long-distance subscriber line suitable for an underpopulated area.

With the WLL system, it is possible to establish a subscriber line without using the existing wired lines in a populated area, and common carriers can provide their service without using the existing wire lines. The WLL is advantageous in the above aspects, and is expected to spread widely in the future. However, the WLL will be used not only for audio communication but also for data communication using facsimile machines and modems.

Conventionally, cellular terminals have been commonly used in a wireless system, and a cellular terminal is normally connected to a facsimile machine or a modem, as shown in FIG. 1. FIG. 1 illustrates a connection between a cellular terminal and a facsimile machine or a modem.

When a cellular terminal 10 and a personal computer 30 are connected, for instance, the connection is made by a cable 40 via an adapter 20 such as a PC card. Accordingly, audio communication and data communication are carried out in separate structures.

In the WLL, on the other hand, a facsimile machine and a modem are connected to a subscriber unit, as shown in FIG. 2. FIG. 2 illustrates connections between a subscriber unit and a facsimile and a modem.

A subscriber unit 50 is provided with separate connectors for telephone, facsimile, and data communication. It is necessary to select a destination for each connector to be connected to a telephone machine 60, a facsimile machine 70, and a personal computer 80. This is because different processes are performed for audio communication and data communication in the subscriber unit 50, and it is necessary to switch the process.

A two-wire public line is provided with a connector 90 as shown in FIG. 3, and the telephone machine 60, the facsimile machine 70, and the personal computer 80 can be connected to the connector 90. Accordingly, a subscriber does not need to select the connector of the destination to connect the telephone machine 60, the facsimile machine 70, or the personal computer 80 to the two-wire public line.

In the WLL, on the other hand, the subscriber unit 50 is provided with the separate connectors for telephone, facsimile, and data communication, as shown in FIG. 2. Therefore, it is necessary to select a destination for each connector to connect the telephone machine 60, the facsimile machine 70, or the personal computer 80.

For common carriers to secure more subscribers, it is essential to eliminate the trouble of separation connections in the WLL. If the connections in the WLL cannot be made as easily as connections on the two-wire public line, it will be difficult to persuade subscribers to switch from the two-wire public line to the WLL system.

SUMMARY OF THE INVENTION

A general object of the present invention is to provide wireless systems in which the above disadvantages are eliminated.

A more specific object of the present invention is to provide a wireless system that comprises a subscriber terminal and a base station which can switch the communication mode based on the type of a signal inputted into the system.

The above objects of the present invention are achieved by a subscriber terminal comprising:

- a connecting unit to which a device for outputting an audio signal or a data signal is connected;
- a tone detecting unit that detects the type of a signal inputted through the connecting unit;
- a signal path switching unit that switches the signal path between an audio signal path and a data signal path;
- a control unit that controls the signal path switching unit based on the detected type of the signal; and
- a communication unit that is wirelessly connected to a general public line network.

By switching the signal path between the audio signal path and the data signal path based on the detected type of the inputted signal, a user can connect either an audio signal outputting device or a data signal outputting device to the signal path switching unit without selecting the corresponding connecting unit. Accordingly, a user can easily connect either an audio signal outputting device or a data signal outputting device to the subscriber terminal of the present invention.

The above objects of the present invention are also achieved by a base station comprising:

- a tone detecting unit that detects the type of a signal inputted from a general public line network;
- a signal path switching unit that switches the signal path between an audio signal path and a data signal path;
- a control unit that controls the signal path switching unit based on the detected type of the signal; and
- a communication unit that is wirelessly connected to a subscriber's home.

By switching the signal path between the audio signal path and the data signal path based on the detected type of the inputted signal, communication can be carried out with either audio signals or data signals in the same wireless system.

The above objects of the present invention are also achieved by a wireless system comprising:

- a subscriber terminal that is connected to a device that outputs an audio signal or a data signal, and switches the signal path between an audio signal path and a data signal path based on a type of a signal inputted from the device; and
- a base station that switches the signal path between an audio signal path and a data signal path based on a type of a signal inputted from a general public line network, wherein the subscriber terminal is wirelessly connected to the base station.

By switching the signal path between the audio signal path and the data signal path based on the detected type of the inputted signal, wireless communication can be carried out without encoding data signals at high compression rate.

The above objects of the present invention are also achieved by a communication mode switching method, comprising the steps of:

selecting an audio signal path as an initial state from signal paths of a subscriber terminal and a base station;

detecting a type of a signal inputted into the subscriber terminal and the base station;

switching the signal path between the audio signal path and a data signal path based on the detected type of the signal; and carrying out wireless communication between the subscriber terminal and the base station via the switched signal path.

By switching the signal path between the audio signal path and the data signal path based on the detected type of the inputted signal, wireless communication can be carried out between the subscriber terminal and the base station with either audio signals or data signals.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
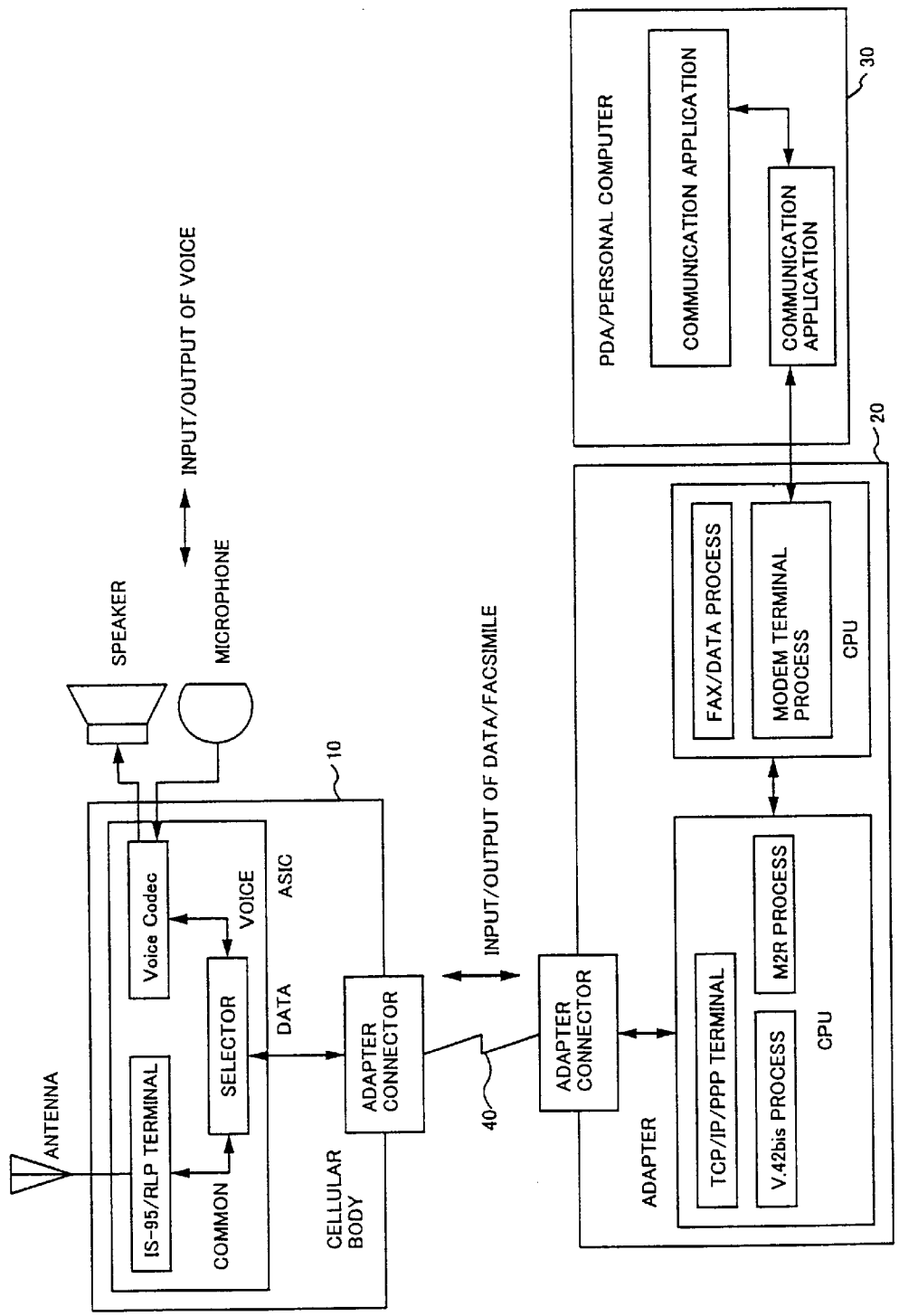
FIG. 1 illustrates the connection between a mobile terminal and a facsimile machine or a modem.
Figure 2:
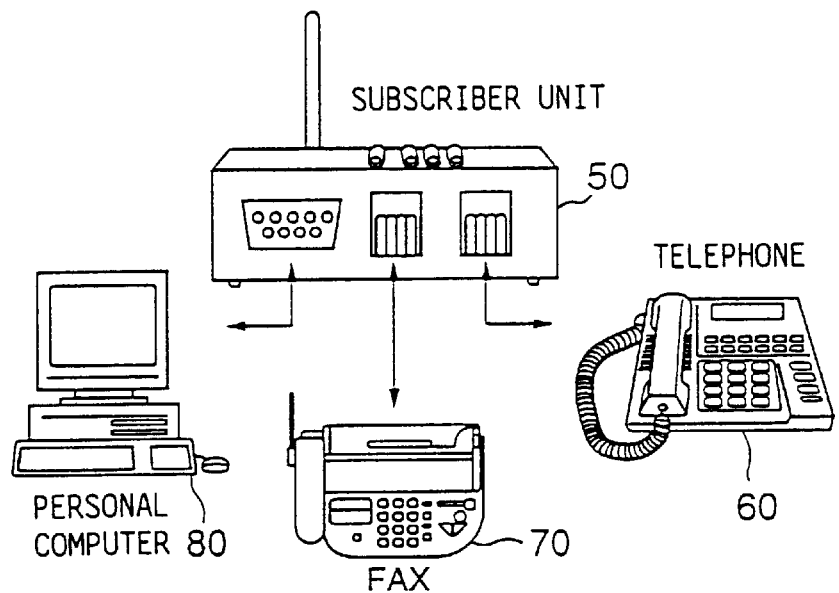
FIG. 2 illustrates the connection between a subscriber's unit and a facsimile machine or a modem.
Figure 3:
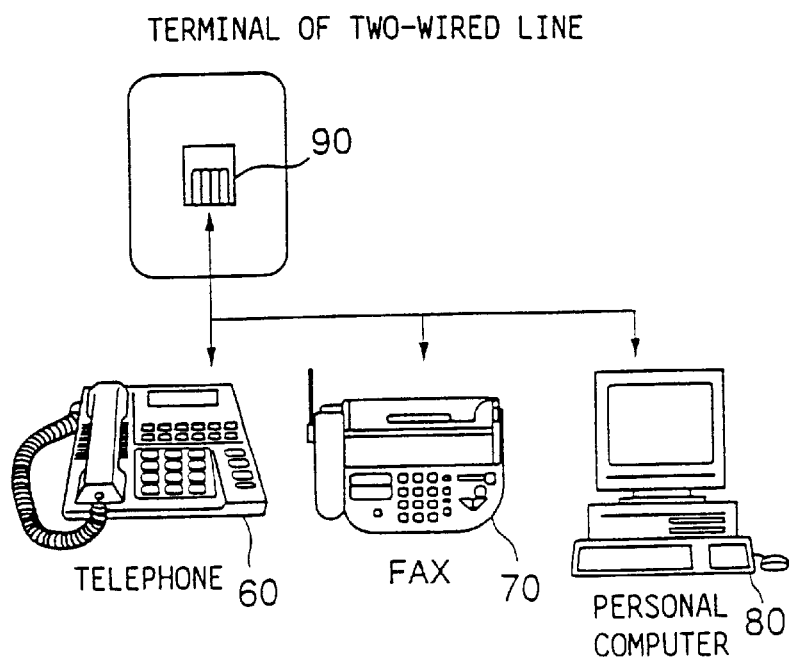
FIG. 3 illustrates the connection between a general wire circuit and a facsimile machine or a modem.
Figure 4:
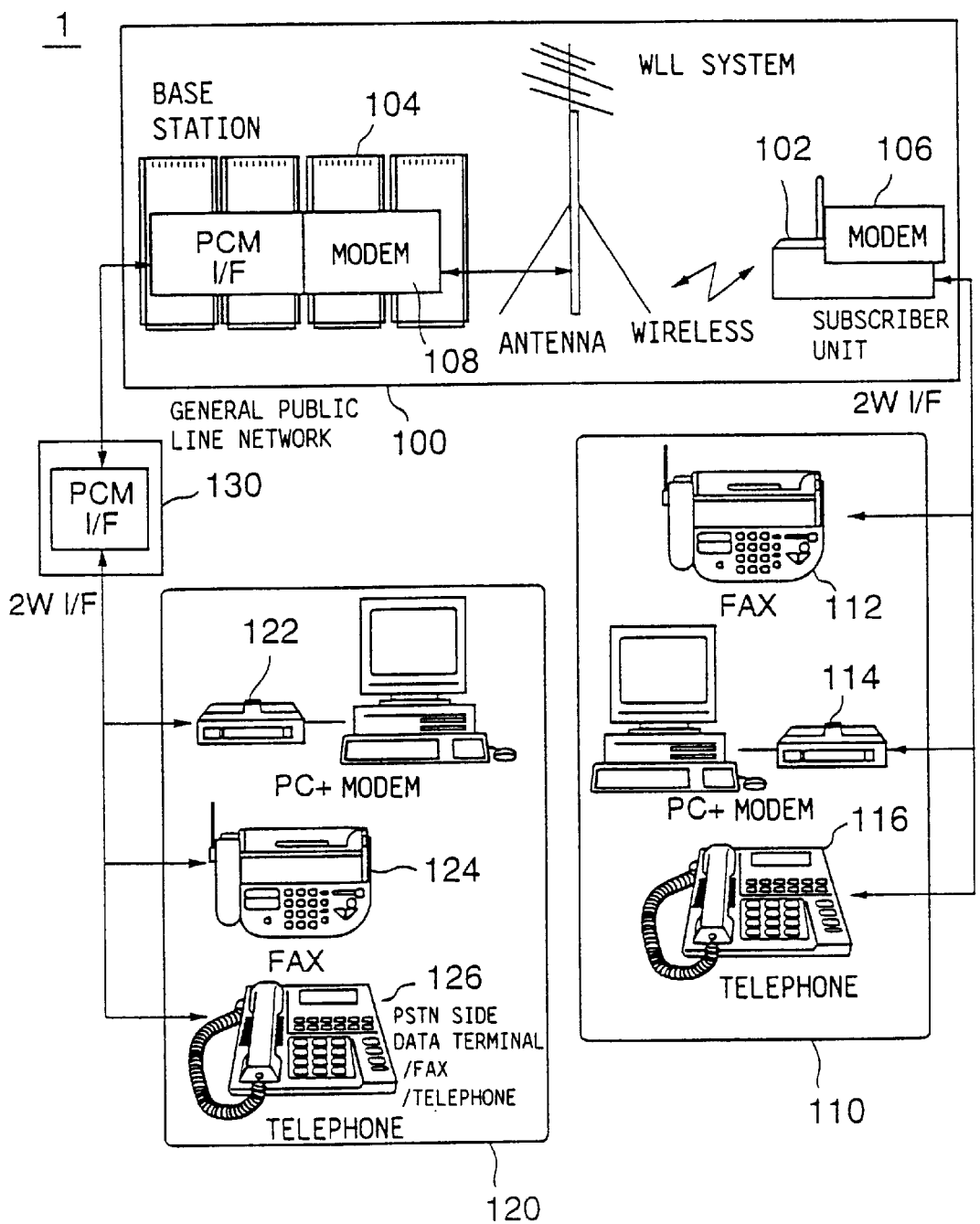
FIG. 4 shows the structure of one embodiment of a system in accordance with the present invention.

FIG. 4 shows the structure of one embodiment of a system in accordance with the present invention. A system 1 utilizing a WLL comprises a WLL system 100, a subscriber's home 110, a subscriber's home 120 on the PSTN (Public Switched Telephone Network), and a general public line network 130.

The WLL system 100 has the same wireless-type interface as the portable telephone, among the PHS (Personal Handyphone System), the PDC (Personal Digital Cellular), and the CDMA (Code Division Multiple Access), all having a wireless-type interface. By the wireless-type interface, a subscriber unit 102 and a base station included in the WLL system 100 are connected similar to a rigidly fixed subscriber line connection.

A facsimile machine 112, a modem 114 connected to a computer, and a telephone 116 of the subscriber's home 110 are connected to the subscriber unit 102 by a two-wire line that is normally used for the wired general public line network. A modem 122 connected to a computer, a facsimile machine 124, and a telephone 126 of the subscriber's home 120 on the PSTN are connected to the base station 104 via the general public line network 130.

In the system 1, when data communication using the modems 114 and 122 or the facsimile machines 112 and 124 is carried out between the subscriber unit 102 and the base station 104, it is necessary to use modems 106 and 108 for the subscriber unit 102 and the base station 104, respectively.

As for the use of a facsimile machine on the general public line network, the procedures of connecting and handling a facsimile machine are specified in recommendation T.30 of the ITU-T (International Telecommunication Union-Telecommunication Standardization Sector). The procedures of connecting for data communication are specified in a recommendation series V of the ITU-T.

However, if telephone communication, facsimile communication, data communication are all carried out on one line in the WLL system 100, the high-compression encoding process for audio communication has adverse effects on the facsimile and data communication. Therefore, when facsimile or data communication is performed, it is necessary to employ a device that does not require a vocoder for highly compressing audio data.

In the WLL system 100, facsimile and data communication modes are set as communication options, and the exchange of the communication options should also be carried out between the subscriber unit 102 and the base station 104.

Accordingly, the present invention enables automatic switching of the communication modes (audio mode, facsimile mode, and data communication mode), without carrying out a wrong operation on the communication path when a facsimile machine specified in the recommendation T.30 and a modem specified in the V series are used for the subscriber unit 102 and the base station 104.

Figure 5:
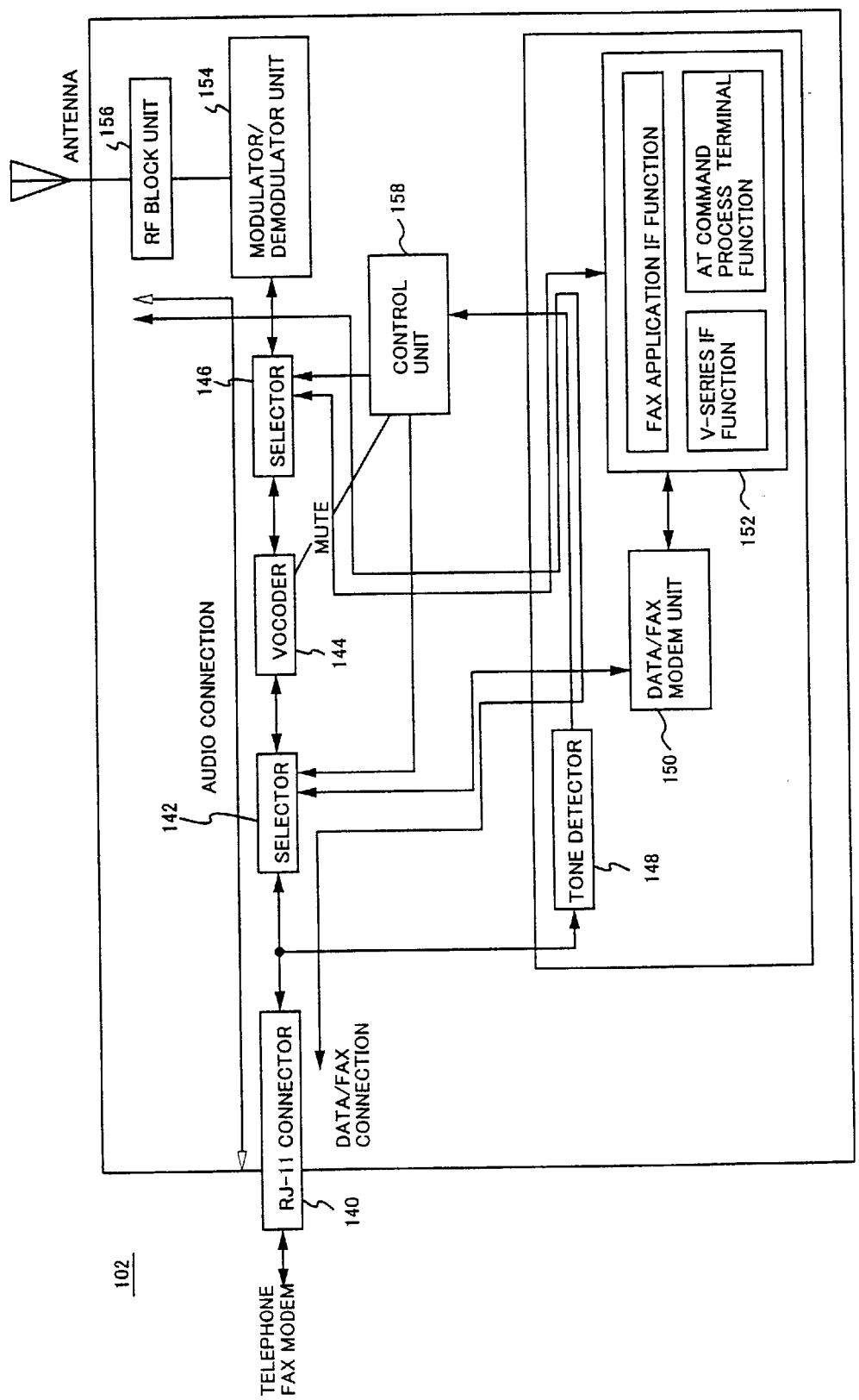
FIG. 5 shows the structure of a subscriber unit of the system shown in FIG. 4.

FIG. 5 shows the structure of the subscriber unit 102 of the present invention. The subscriber unit 102 comprises a connector 140, a selector 142, a vocoder 144, a selector 146, a tone detector 148, a data/fax modem unit 150, an IF function unit 152, a modulator/demodulator unit 154, an RF block unit 156, and a control unit 158.

The connector 140 is an RJ-11 standard connector. The facsimile machine 112, the modem 114, and the telephone 116 of the subscriber's home 110 are connected to the RJ-11 connector 140. The vocoder 144 encodes or decodes audio signals at a high compression rate. The tone detector 148 detects the type of a signal, such as data signal, facsimile signal, or number dialing signal, at the time of line connecting.

The data/facsimile modem unit 150 converts a supplied data signal or a facsimile signal into a digital signal, or converts a supplied digital signal into a data signal or a facsimile signal. The modulator/demodulator unit 154 modulates a digital signal to a radio signal or demodulates a radio signal to a digital signal. The RF block unit 156 converts a radio signal to a high-frequency wave or detects a radio signal from a high-frequency wave.

The control unit 158 receives a detection result from the tone detector 148, and, based on the detection result, controls the selectors 142 and 146 so as to switch the communication mode (audio mode, facsimile mode, and data communication mode). If the detection result indicates an audio signal, for instance, the selector 142 under the control of the control unit 158 connects the RJ-11 connector 140 to the vocoder 144. If the detection result indicates a data signal or a facsimile signal, the selector 142 under the control of the control unit 158 connects the RJ-11 connector 140 to the data/facsimile modem unit 150. The IF function unit 152 includes a facsimile application IF function, a V-series IF function, and an AT command processing terminal function.

As described above, the subscriber unit 102 of FIG. 5 can switch the signal path for audio signals and data/facsimile signals by the selectors 142 and 146 in accordance with the communication mode.

Figure 6:
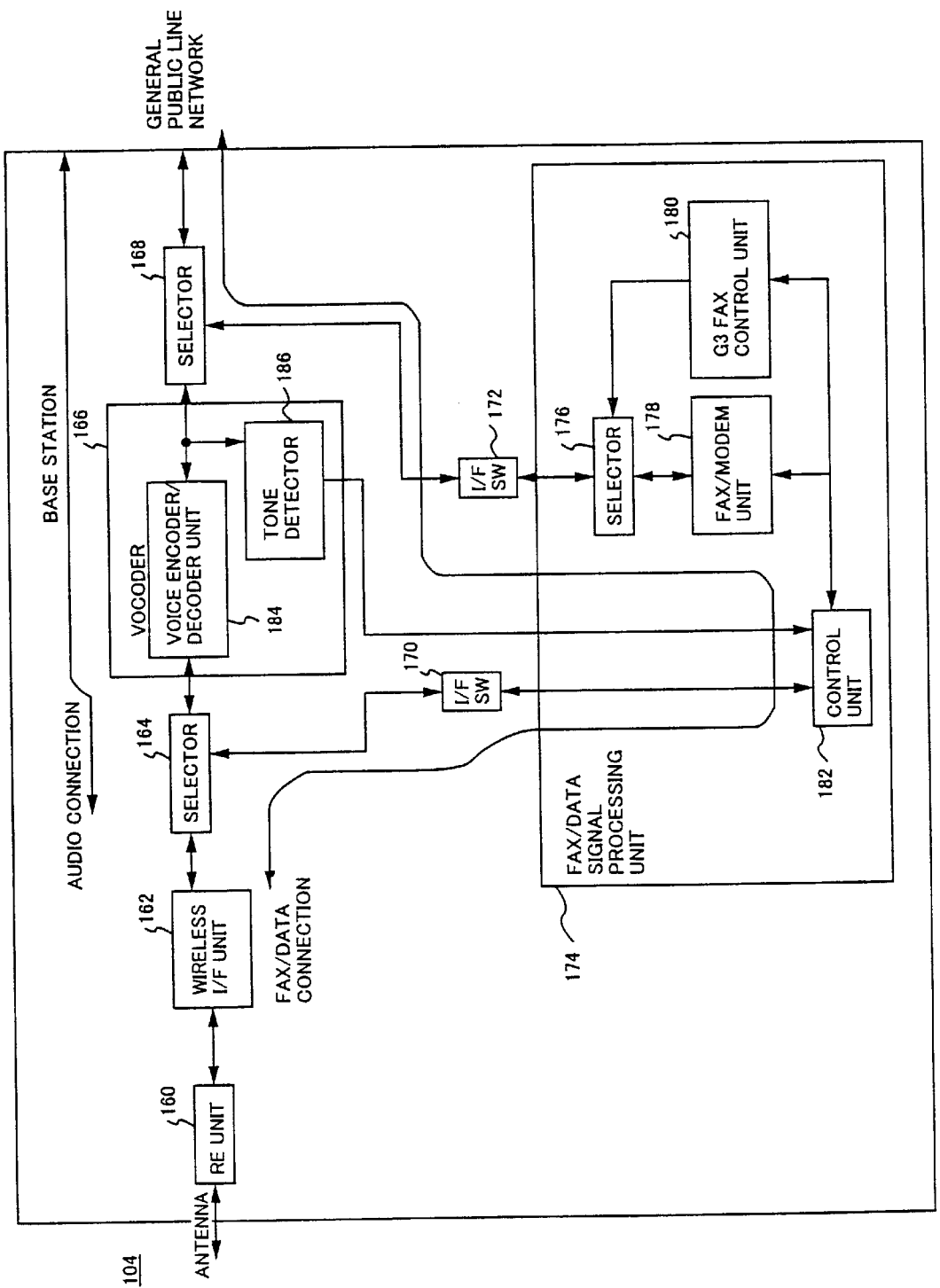
FIG. 6 shows the structure of a base station of the system shown in FIG. 4.

FIG. 6 shows the structure of the base station 104 of the system shown in FIG. 4. The base station 104 comprises an RF unit 160, a wireless interface unit 162, a selector 164, a vocoder 166, a selector 168, interface switches 170 and 172, a facsimile/data signal processing unit 174. The facsimile/data signal processing unit 174 comprises a selector 176, a facsimile/modem unit 178, a facsimile control unit 180, and a control unit 182.

The RF unit 160 is connected to an antenna so as to convert a supplied radio signal into a high-frequency wave or detect a radio signal from a high-frequency wave. The wireless interface unit 162 modulates a digital signal to a radio signal or demodulates a radio signal to a digital signal. The facsimile/modem unit 178 converts a data signal into a digital signal or converts a digital signal into a data signal. The facsimile control unit 180 converts a facsimile signal into a digital signal or converts a digital signal into a facsimile signal.

The vocoder 166 comprises a voice encoder/decoder unit 184 and a tone detector 186 to encode or decode an audio signal at a high compression rate and to detect the type of a signal, such as data signal, facsimile signal, number dialing signal, at the time of line connecting.

The control unit 182 receives a detection result from the tone detector 186, and, based on the detection result, controls the selectors 164, 168, and 176 so as to switch the communication mode (audio mode, facsimile mode, and data communication mode). If the detection result indicates an audio signal, for instance, the selector 164 under the control of the control unit 182 connects the wireless interface unit 162 to the vocoder 166. If the detection result indicates a data signal or a facsimile signal, the selector 164 under the control of the control unit 182 connects the wireless interface unit 162 to the interface switch 170.

As described above, the base station 104 shown in FIG. 6 can switch the signal path for audio signals and data/facsimile signals by the selectors 164, 168, and 176, in accordance with the communication mode.

Figure 7:
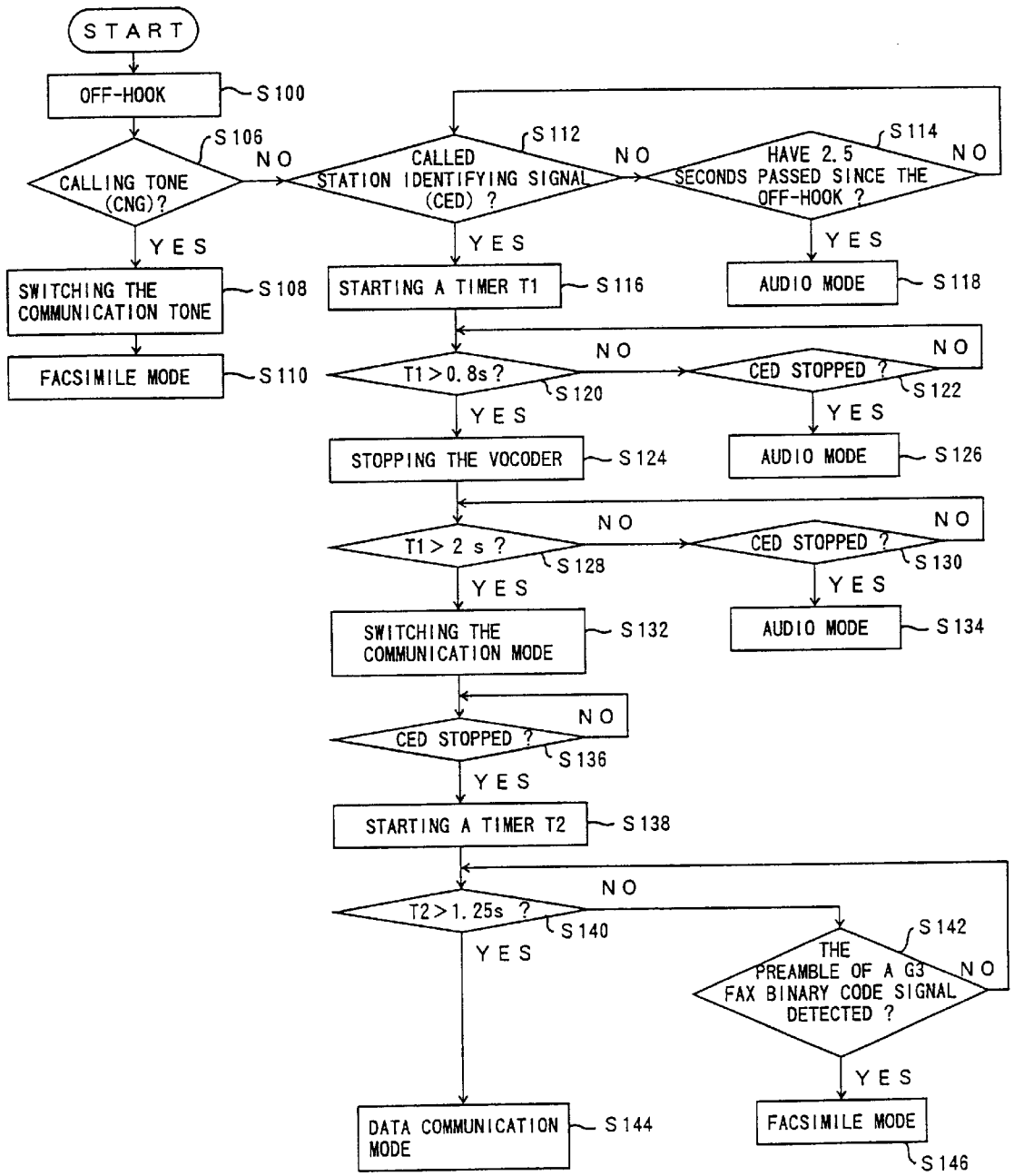
FIG. 7 is a flowchart of a first embodiment of a communication mode switching process in accordance with the present invention.

FIG. 7 is a flowchart of a first embodiment of a communication mode switching process in accordance with the present invention. In this flowchart, the line is connected by off-hook in step S100.

In step S106, it is determined whether or not a calling tone (CNG) specified in the recommendation T.30 of the ITU-T is detected. If a calling tone (CNG) is detected, the operation advances to step S108, because the facsimile machine is connected to the caller side. In step S108, the communication mode is switched to the facsimile mode. On the other hand, if a calling tone (CNG) is not detected, the operation moves on to step S112.

In step S112, it is determined whether or not a called station identifying signal (CED) specified in the recommendation T.30 of the ITU-T is detected. If a called station identifying signal (CED) is detected, the operation advances to step S116. If a called station identifying signal (CED) is not detected, the operation advances to step S114.

In step S114, it is determined whether 2.5 seconds have passed since the off-hook. If it is determined that 2.5 seconds have passed since the off-hook, the operation moves on to step S118. In step S118, it is determined that the time has run out, and the communication mode is switched to the audio mode. If it is determined that 2.5 seconds have passed since the off-hook, the operation returns to step S112.

In step S116, as a called station identifying signal (CED) is detected, a timer T1 is started. In step S120, it is determined whether or not 0.8 second has passed on the timer T1. If it is determined that 0.8 second has passed the timer T1, the operation advances to step S124. If it is determined that the timer T1 indicates less than 0.8 seconds, the operation moves on to step S122.

Although it is determined whether 0.8 second has passed on the timer T1 in step S120, the time is not limited to 0.8 second, and may be 1 second or less so as to prevent a called station identifying signal from passing through the vocoder and being detected at the caller's side. As long as the timer indicates within 1 second, the operation does not move onto the next step.

This 1-second limit is set in accordance with the modem connection procedures specified in the V-series recommendation, so as to prevent the operation from moving on to the next step even in the modem connecting procedures. More specifically, since the called station identifying signal of the facsimile machine and the answer tone of the modem are the same, the communication mode cannot be decided between the facsimile mode and the data communication mode at this stage. Accordingly, the operation is prevented from moving on to the next step even in the modem connecting procedures.

In step S122, it is determined whether or not a called station identifying signal (CED) has stopped. If it is determined that the called station identifying signal (CED) has stopped, the operation moves on to step S126. In step S126, the communication mode is decided to be the audio mode. If it is determined in step S122 that the called station identifying signal (CED) has not stopped, the operation returns to step S120.

In step S124, as the timer T1 indicates 0.8 seconds or more, the vocoder, which encodes or decodes an audio signal at a high compression rate, is stopped. This process serves to prevent inconvenience in the subscriber unit due to a facsimile signal or a data signal processed by the vocoder.

In step S128, it is determined whether 2 seconds have passed on the timer T1. If it is determined that 2 seconds have passed on the timer T1, the operation advances to step S132. If it is determined in step S128 that 2 seconds have not passed on the timer. 1T yet, the operation moves on to step S130. Although it is determined whether 2 seconds have passed on the timer T1 in step S128, the time is not limited to 2 seconds, and may be about 2.6 seconds since the timer T1 is set in step S116.

In step S130, it is determined whether or not a called station identifying signal (CED) has stopped. If it is determined that the called station identifying signal (CED) has stopped, the operation advances to step S134. In step S134, the communication mode is decided to be the audio mode. If it is determined in step S130 that the called station identifying signal (CED) has not stopped, the operation returns to step S128.

In step S132, as 2 seconds have passed on the timer T1, the communication mode is decided to be the facsimile/data communication mode, and a selector is controlled to switch the signal path to the data/facsimile signal paths. The operation then advances to step S136. In step S136, it is determined whether or not a called station identifying signal (CED) has stopped. If it is determined that the called station identifying signal (CED) has stopped, the operation moves on to step S138. If it is determined that the called station identifying signal (CED) has not stopped, the process of step S136 is repeated.

In step S138, as the called station identifying signal (CED) has stopped, a timer T2 is started. The operation then advances to step S140. In step S140, it is determined whether or not 1.25 seconds have passed on the timer T2. If it is determined that 1.25 seconds have passed on the timer T2, the operation moves on to step S144. In step S144, the communication mode is switched to the data communication mode.

If it is determined in step S140 that 1.25 seconds have not passed on the timer T2, the operation moves on to step S142. In step S142, it is determined whether or not a preamble signal of a binary code signal specified in the recommendation T.30 of the ITU-T has been detected.

If it is determined that a preamble signal has been detected, the operation moves on to step S146. In step S146, the communication mode is switched to the facsimile mode. If it is determined in step S142 that a preamble signal has not been detected, the operation returns to step S140.

The 1.25 seconds used in the process of step S140 is set in the requirement for a preamble signal in the binary code signal facsimile procedures specified in the recommendation T.30 of the ITU-T. A preamble signal of a facsimile signal should be outputted within 1.25 seconds since the stop of a called station identifying signal (CED). Accordingly, if a preamble signal is detected within 1.25 seconds, the facsimile mode is selected. If no preamble signal is detected within 1.25 seconds, the data communication mode is selected.

As described above, the communication mode of the WLL system can be switched in accordance with the type of a signal inputted into the WLL system.

Figure 8:
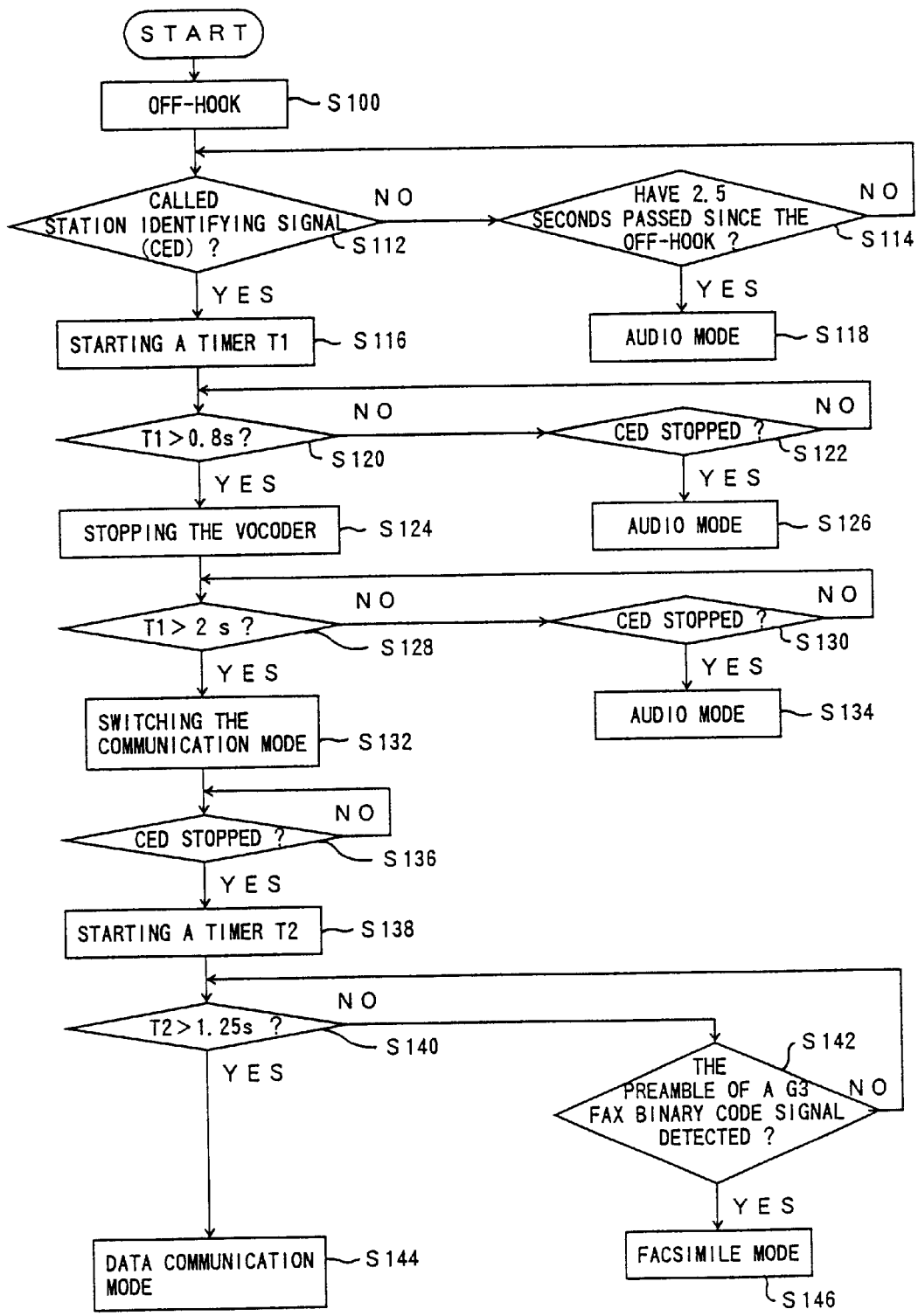
FIG. 8 is a flowchart of a second embodiment of the communication mode switching process in accordance with the present invention.

FIG. 8 is a flowchart of a second embodiment of the communication mode switching process in accordance with the present invention. It should be noted that the flowchart of FIG. 8 lacks steps S106 through 110 shown in the flowchart of FIG. 7. More specifically, according to the flowchart of FIG. 8, the operation moves on to step S112, without detecting a calling tone (CNG). In step S112, it is determined whether or not a called station identifying signal (CED) specified in the recommendation T.30 of the ITU-T has been detected.

The other steps in the flowchart of FIG. 8 are the same as in the flowchart of FIG. 7. The same steps are denoted by the same reference numerals, and the descriptions for those steps are omitted accordingly.

Figure 9:
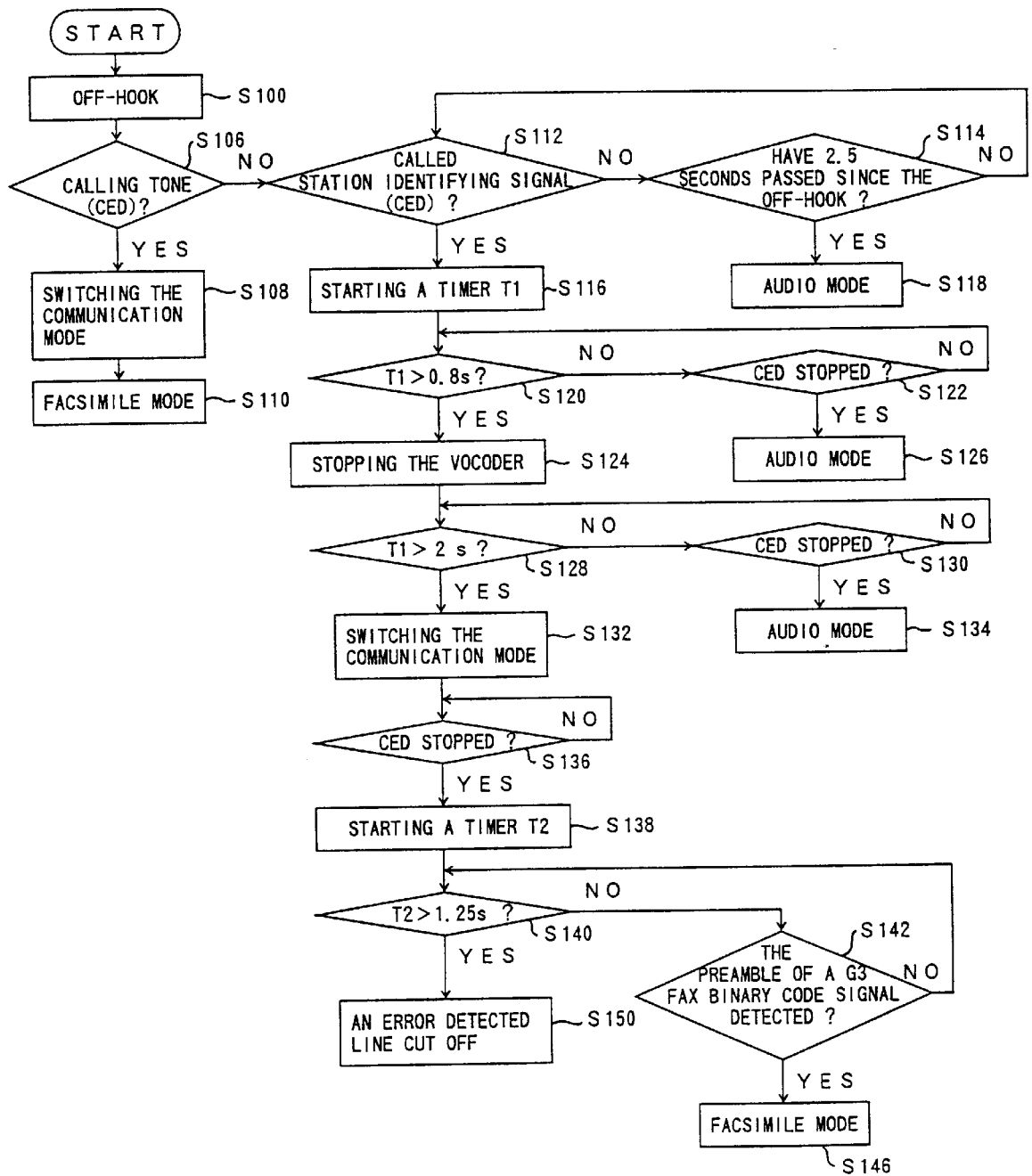
FIG. 9 is a flowchart of a third embodiment of the communication mode switching process in accordance with the present invention.

FIG. 9 is a flowchart of a third embodiment of the communication mode switching process in accordance with the present invention. The communication mode switching process of this embodiment is for switching the communication mode between the audio mode and the facsimile mode. In this flowchart, the same steps as in the flowchart of FIG. 7 are denoted by the same reference numerals, and the descriptions for those steps are omitted accordingly.

In the flowchart of FIG. 9, after steps S100 through S138, the operation moves on to step S140. In step S140, it is determined whether 1.25 seconds have passed on the timer T2. If it is determined that 1.25 seconds have passed on the timer T2, the operation advances to step S150.

More specifically, when the timer T2 indicates 1.25 seconds or more, it is determined that the time has run out. The communication mode is then switched to an error mode, and the line is cut off. Accordingly, when a preamble signal is detected within the 1.25 seconds, the communication mode is decided to be the facsimile mode. When a preamble signal is not detected within the 1.25 seconds, on the other hand, the line is cut off.

As described above, it is possible to switch the communication mode between the audio mode and the facsimile mode in the WLL system, in accordance with the type of a signal inputted into the WLL system. Also, even if a data communication signal is wrongly inputted into the WLL system, the communication mode can be switched to the error mode, and the line can be cut off immediately.

Figure 10:
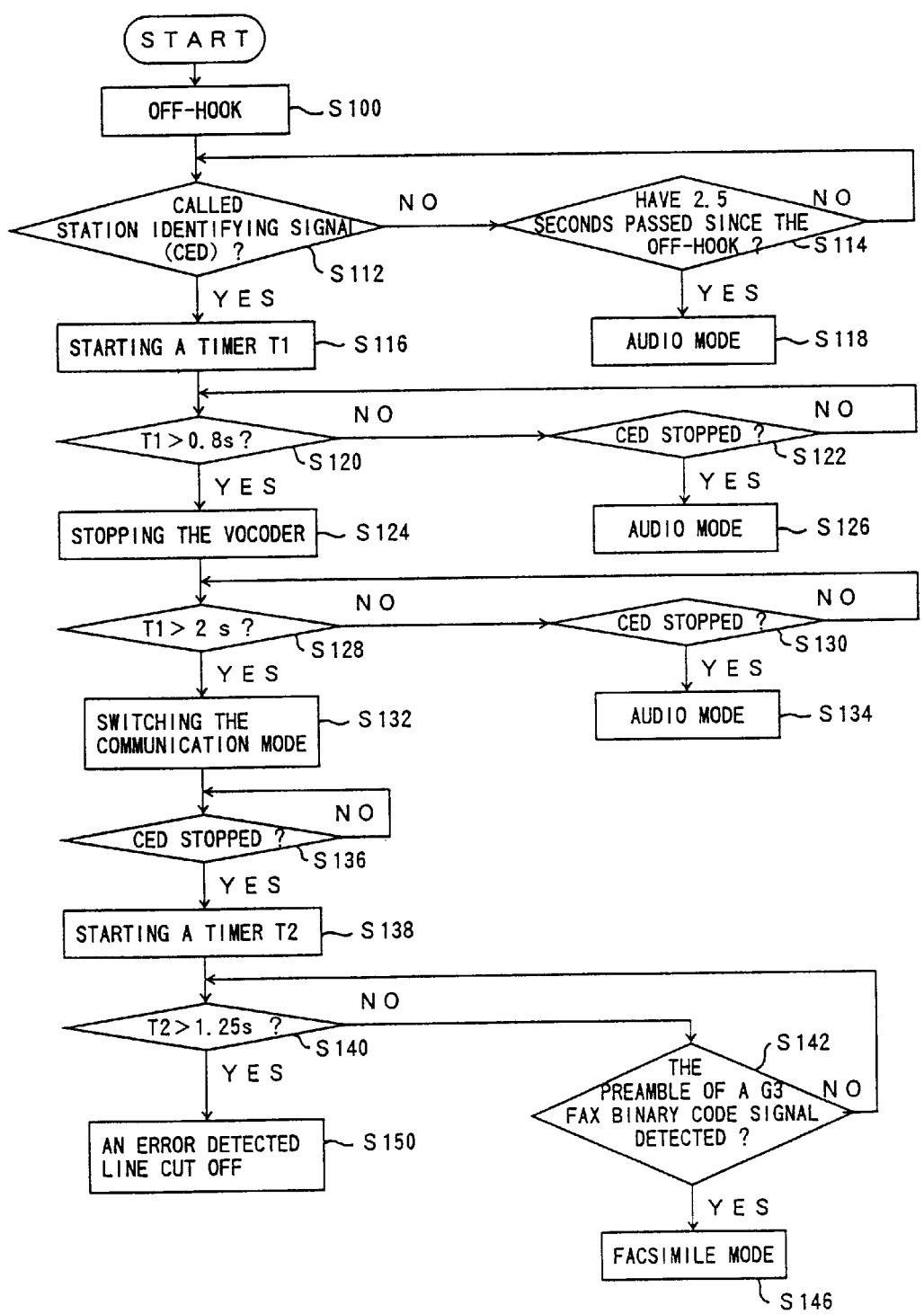
FIG. 10 is a flowchart of a fourth embodiment of the communication mode switching process in accordance with the present invention.

FIG. 10 is a flowchart of a fourth embodiment of the communication mode switching process in accordance with the present invention. The communication mode switching process of this embodiment is for switching the communication mode between the audio mode and the facsimile mode. It should be noted that the flowchart of FIG. 10 lacks steps S106 through S110 shown in the flowchart of FIG. 9.

More specifically, according to the flowchart of FIG. 10, the operation moves on to step S112, without detecting a calling tone (CNG). In step S112, it is determined whether or not a called station identifying signal (CED) specified in the recommendation T.30 of the ITU-T has been detected.

The other steps in the flowchart of FIG. 10 are the same as in the flowchart of FIG. 9, and are denoted by the same reference numerals. The descriptions for those steps are omitted accordingly.

Figure 11:
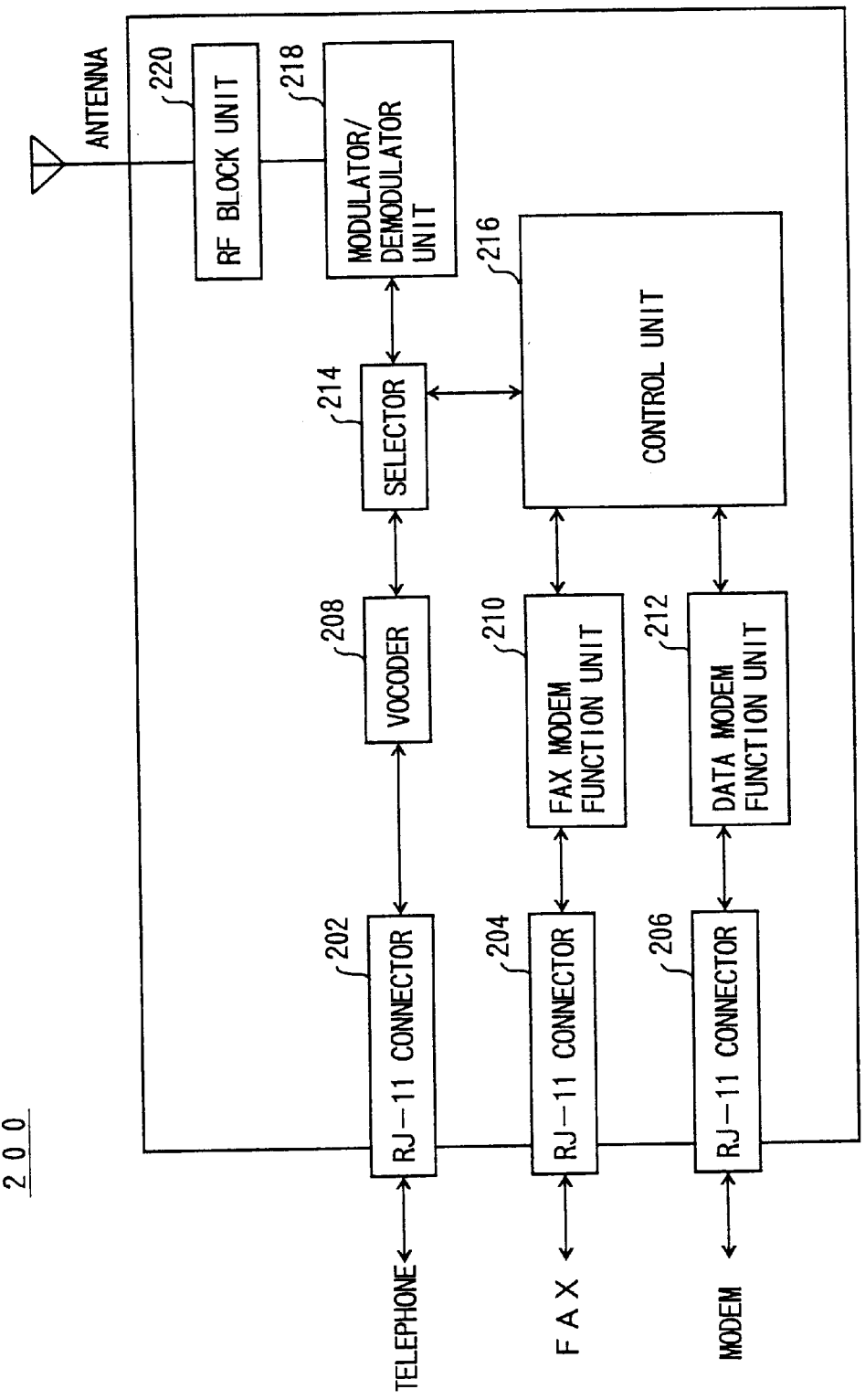
FIG. 11 shows the structure of another embodiment of the subscriber unit of the system in accordance with the present invention.
Figure 12:
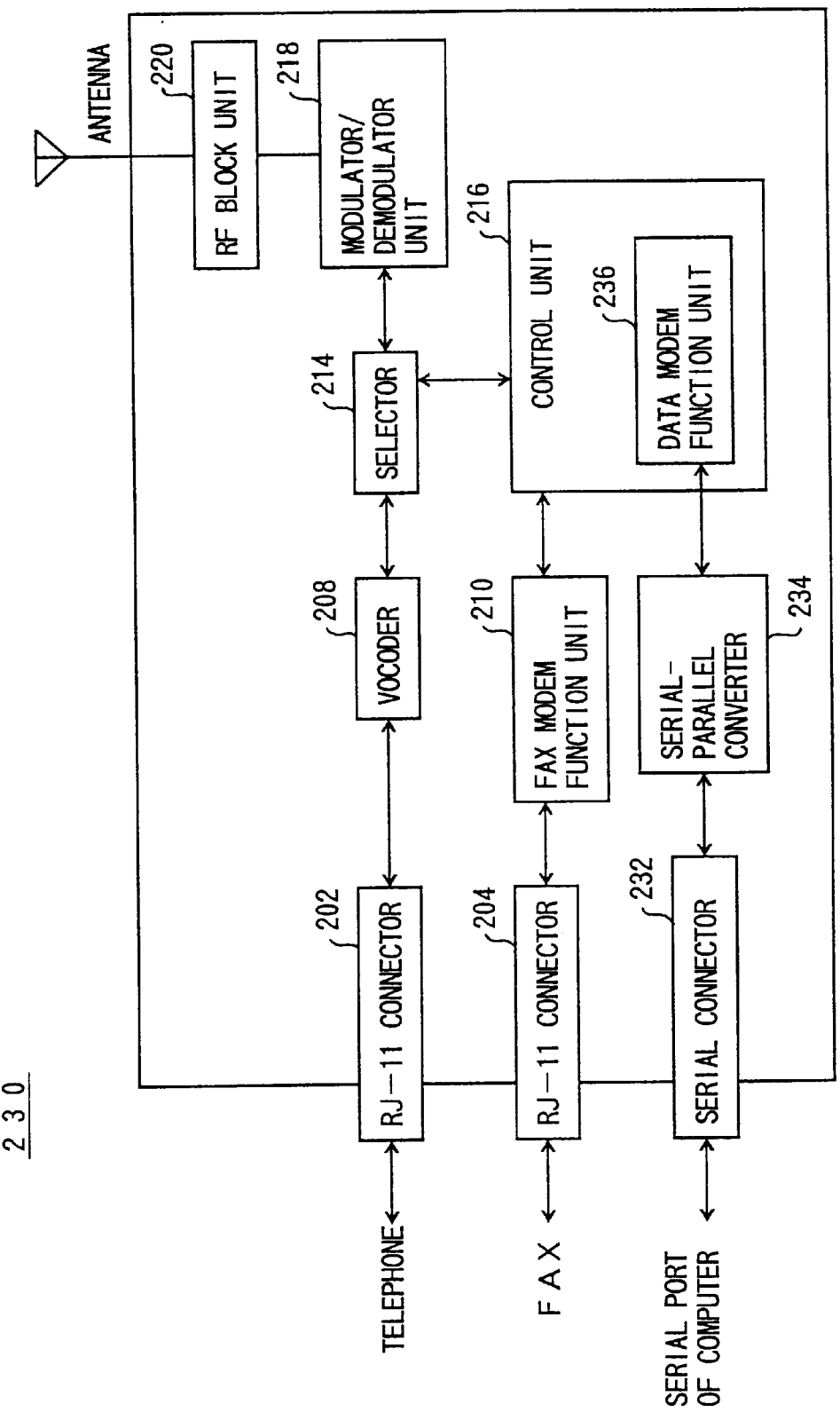
FIG. 12 shows the structure of yet another embodiment of the subscriber unit of the system in accordance with the present invention.

Referring now to FIGS. 11 and 12, other embodiments of the subscriber unit 102 shown in FIG. 5 will be described below. FIGS. 11 and 12 show the structures of the other embodiments of the subscriber unit of the present invention.

As shown in FIG. 11, a subscriber unit 200 comprises RJ-11 connectors 202, 204, and 206, a vocoder 208, a facsimile modem function unit 210, a data modem function unit 212, a selector 214, a control unit 216, a modulator/demodulator unit 218, and an RF block unit 220.

The RJ-11 connector 202 is an RJ-11 standard connector, and connected to a telephone of a subscriber's home. The RJ-11 connector 204 is connected to a facsimile machine of the subscriber's home. The RJ-11 connector 206 is connected to the modem of the subscriber's home.

The vocoder 208 connects the RJ-11 connector 202 to the selector 214, and encodes or decodes a supplied audio signal at a high compression rate. The facsimile modem function unit 204 connects the RJ-11 connector 204 to the control unit 216, and converts a supplied facsimile signal into a digital signal or converts a supplied digital signal into a facsimile signal. The data modem function unit 212 connects the RJ-11 connector 206 to the control unit 216, and converts a supplied data signal into a digital signal or converts a supplied digital signal into a data signal.

The modulator/demodulator unit 218 modulates a digital signal to a radio signal or demodulates a radio signal to a digital signal. The RF block unit 220 converts a radio signal into a high-frequency wave or detects a radio signal from a high-frequency wave. The selector 214 selects a signal from an audio signal, a data signal, and a facsimile signal, and switches the signal path accordingly.

The control unit 216 controls the selector 214 so as to switch the communication mode (audio mode, facsimile mode, and data communication mode). However, when a call is made from the subscriber unit 200, any of the communication mode switching processes shown in FIGS. 7 through 10 is unnecessary, and a communication mode switching process is necessary in the base station instead.

As describe above, in accordance with the subscriber unit 200 shown in FIG. 11, the communication mode switching process required both in the subscriber unit 102 of FIG. 5 and the base station 104 is not necessary in the subscriber unit 200 of this embodiment.

As shown in FIG. 12, a subscriber unit 230 comprises the RJ-11 connectors 202 and 204, the vocoder 208, the facsimile modem function unit 210, the selector 214, the control unit 216, the modulator/demodulator unit 218, the RF block unit 220, a serial connector 232, a serial/parallel converter function unit 234, and a data modem function unit 236. In FIG. 12, the same components as in FIG. 11 are denoted by the same reference numerals, and the descriptions for those components are omitted accordingly.

The serial connector 232 is a serial port connector, and is connected to the serial port of a computer of a subscriber's home. The serial/parallel converter function unit 234 connects the serial connector 232 to the data modem function unit 236 contained in the control unit 216, and subjects a supplied signal to serial/parallel conversion. The data modem function unit 236 converts a supplied data signal into a digital signal or converts a supplied digital signal into a data signal.

As described above, according to the subscriber unit 230 shown in FIG. 12, the communication mode switching process required in both the subscriber unit 102 of FIG. 5 and the base station 104 is not necessary in the subscriber unit 230 of this embodiment. Also, it is possible to connect the subscriber unit 230 directly to the serial port of a computer of the subscriber's home.

Figure 13:
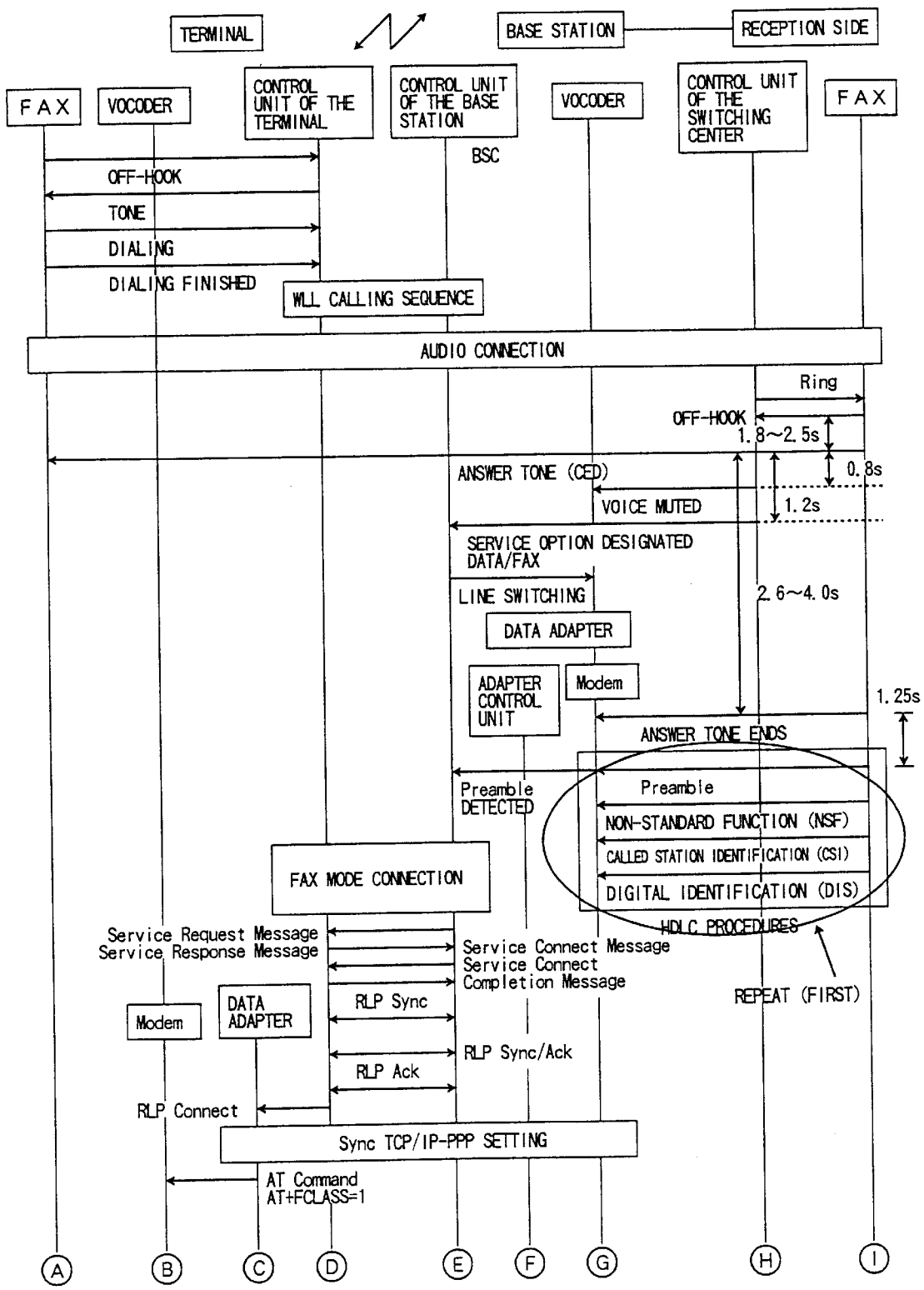
FIG. 13 is a sequence diagram of one embodiment of a facsimile communication process when a call is made from a subscriber unit.
Figure 14:
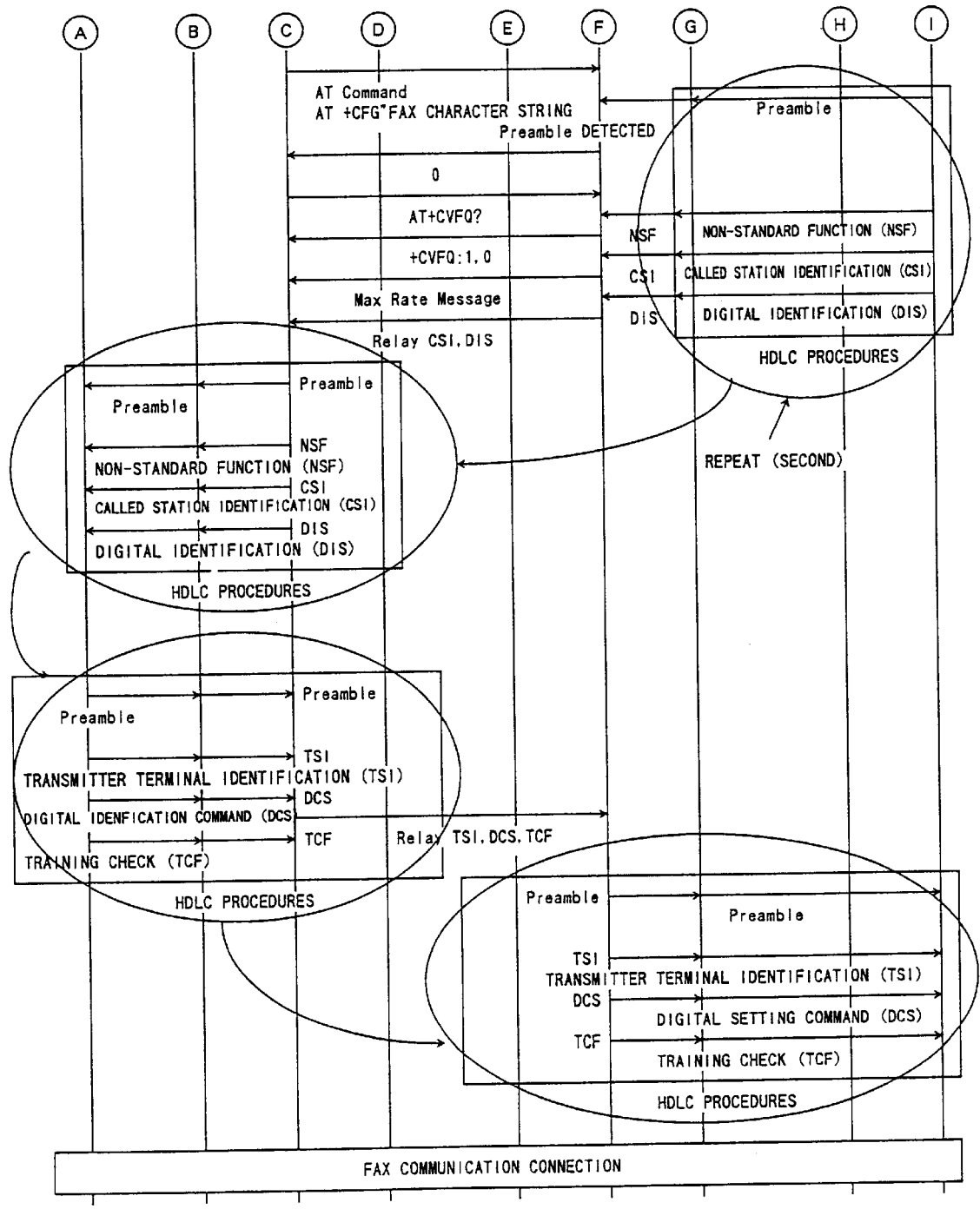
FIG. 14 is a sequence diagram continued from the sequence diagram of FIG. 13.

Referring now to FIGS. 13 and 14, a specific example of a facsimile communication process will be described below. In this example, a call is made from a facsimile machine connected to a subscriber unit to a facsimile machine connected to the general public line network. FIG. 13 is a sequence diagram of a facsimile communication process when a call is made from the subscriber unit. FIG. 14 is a sequence diagram continued from the sequence diagram of FIG. 13.

First, a document to be transmitted is set to a facsimile machine connected to a subscriber unit, and the facsimile number of the destination is dialed. As the start button is pressed, the facsimile machine automatically carries out off-hook and dialing operations. The subscriber unit then detects the movement of the facsimile machine, and a WLL calling sequence is carried out between the subscriber unit and the base station. Accordingly, the caller facsimile machine and the reception switching center are in an audio-connected state at this stage.

The reception switching center receives a call from or makes a call to a reception facsimile machine, and the reception facsimile machine automatically carries out off-hook. When a predetermined period of idle time has passed since the off-hook, the reception facsimile machine transmits a called station identifying signal (answer tone) in accordance with the recommendation T.30 of the ITU-T. Detecting the called station identifying signal, the base station stops (or mutes) the vocoder, and switches the communication line from the vocoder side to the modem side.

When the called station identifying signal (answer tone) finishes, the reception facsimile machine transmits a preamble signal and initial connection information to the base station in accordance with the HDLC (High-level Data Link Control) procedures in compliance with the recommendation T.30 of the ITU-T. The base station detects the preamble signal, and carries out a connecting process for switching the connection with the subscriber unit to the facsimile mode (TCP/IP-PPP setting).

In the following communication, the control unit of the subscriber unit controls the modem of the base station, while the control unit of the base station controls the modem of the subscriber unit by commands such as AT commands. Here, the communication between the subscriber unit and the base station is carried out with digital signals, while the communication between the subscriber unit and the caller facsimile machine, and the communication between the base station and the reception facsimile machine are carried out with modulation signals. After transmitting the first preamble signal and the initial connection information, the reception facsimile machine transmits a second preamble signal and initial connection information, because there is no response from the caller facsimile machine. In accordance with the recommendation T.30 of the ITU-T, the transmission should be repeated for 35±5 seconds until receiving a response from the other side.

The base station detects the second preamble signal, and transmits the detection result in the form of AT commands or the like to the modem of the subscriber unit in the WLL system. The subscriber unit then transmits the same signal as the signal transmitted from the reception facsimile machine to the caller facsimile machine.

In response to the signal transmitted from the subscriber unit, the caller facsimile machine returns signals in compliance with the recommendation T.30 of the ITU-T. The modem of the subscriber unit detects the signal transmitted from the caller facsimile machine, and transmits a command such as an AT command to the modem of the base station in the WLL system. The switching center then transmits the same signal as the signal transmitted from the caller facsimile machine to the reception facsimile machine. The rest of the operation is the same as in the facsimile communication connection on the general public line network.

Figure 15:
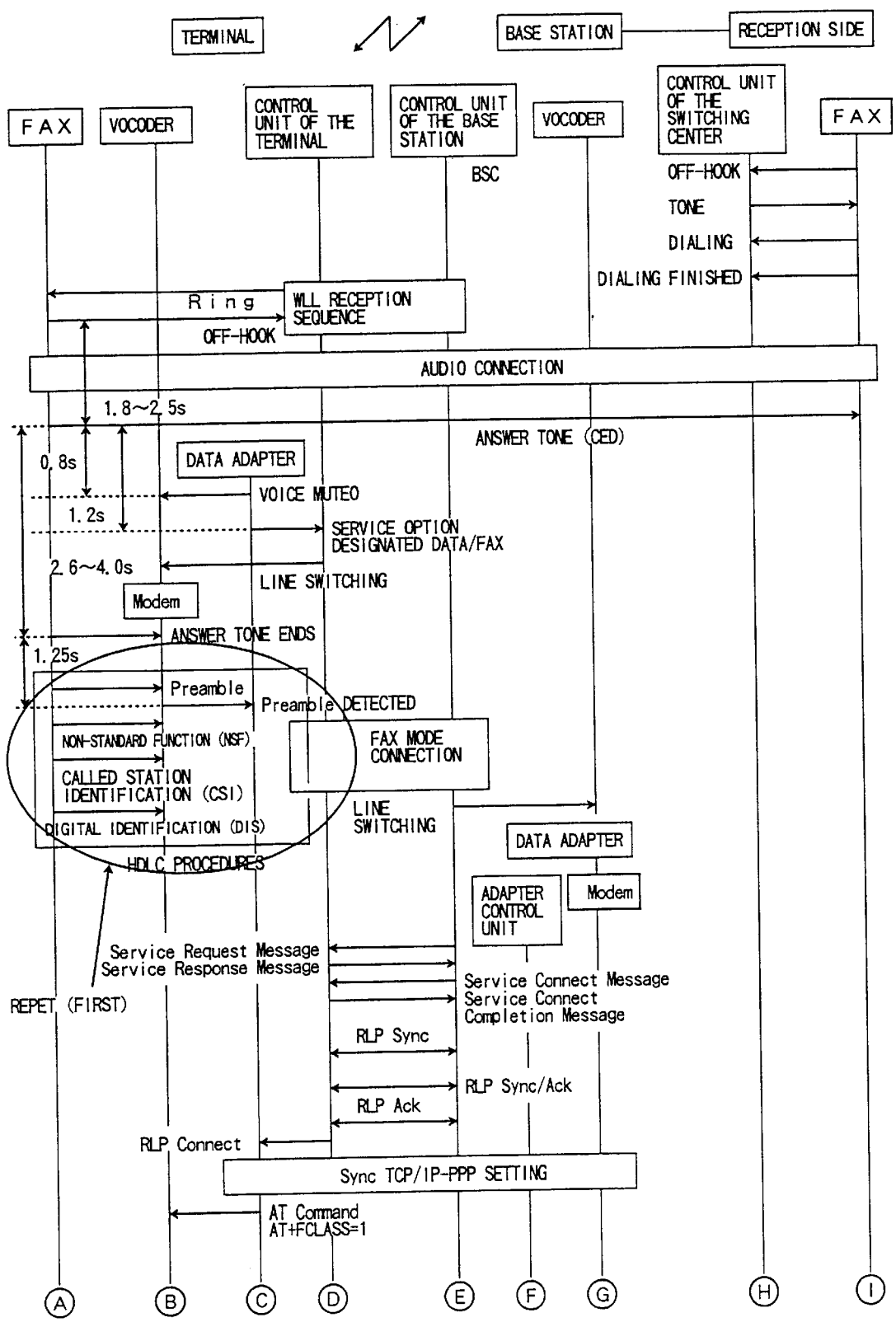
FIG. 15 is a sequence diagram of one embodiment of a facsimile communication process when a call is made from the general public line network.
Figure 16:
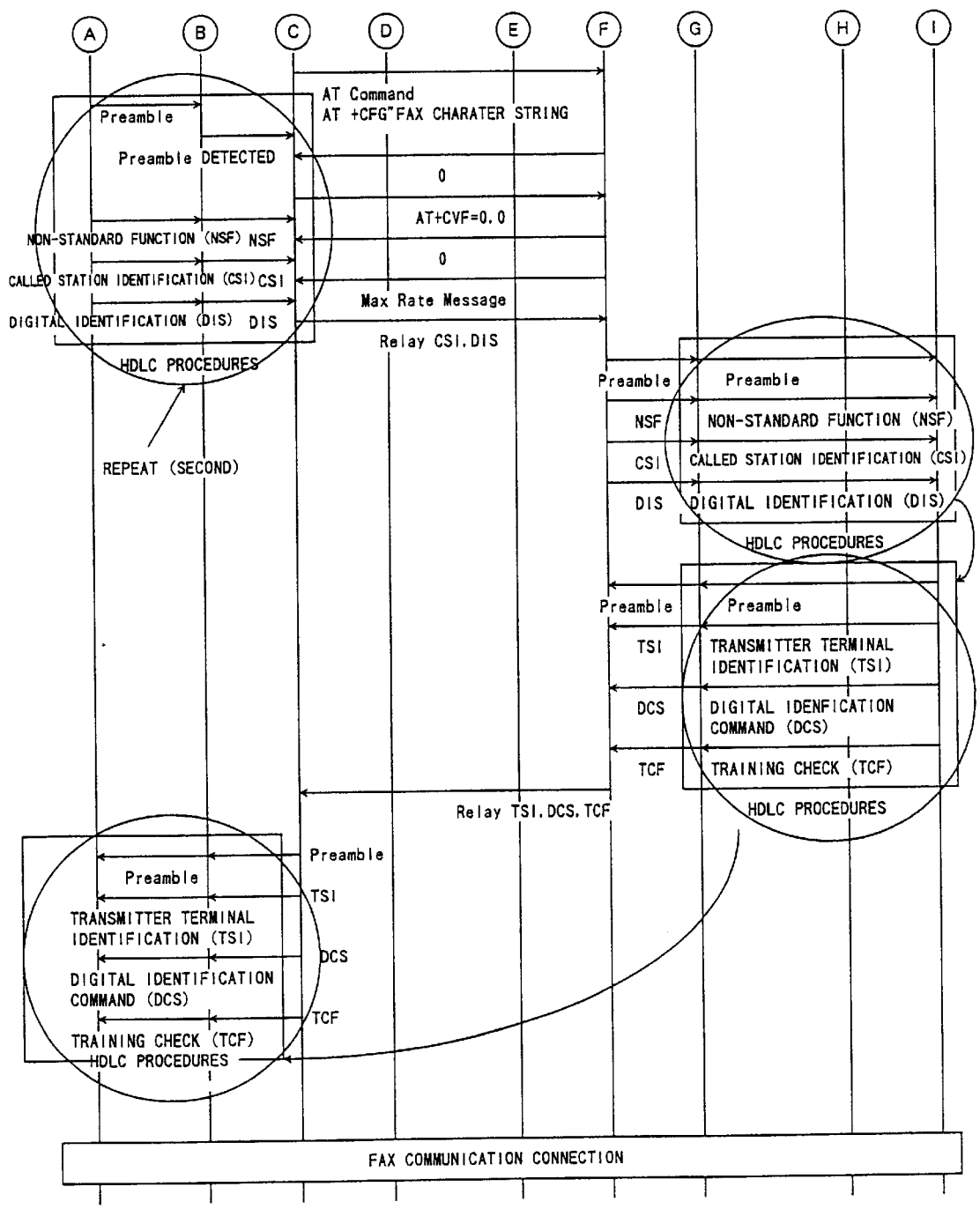
FIG. 16 is a sequence diagram continued from the sequence diagram of FIG. 15.

Referring now to FIGS. 15 and 16, another specific example of a facsimile communication process will be described below. In this example, a call is made from a facsimile machine connected to the general public line network to a facsimile machine connected to a subscriber unit. FIG. 13 is a sequence diagram of a facsimile communication process when a call is made from the general public line network. FIG. 14 is a sequence diagram continued from the sequence diagram of FIG. 13.

First, a document to be transmitted is set to a facsimile machine connected to the general public line network, and the facsimile number of the destination is dialed. As the start button is pressed, the facsimile machine automatically carries out off-hook and dialing operations. The base station then detects the movement of the facsimile machine, and a WLL calling sequence is carried out between the subscriber unit and the base station. Accordingly, the caller facsimile machine and the reception subscriber unit are in-an audio-connected state at this stage.

The reception subscriber unit receives a call from or makes a call to a reception facsimile machine, and the reception facsimile machine automatically carries out off-hook. When a predetermined period of idle time has passed since the off-hook, the reception facsimile machine transmits a called station identifying signal (answer tone) in accordance with the recommendation T.30 of the ITU-T. Detecting the called station identifying signal, the base station stops (or mutes) the vocoder, and switches the communication line from the vocoder side to the modem side.

When the called station identifying signal (answer tone) finishes, the reception facsimile machine transmits a preamble signal and initial connection information to the subscriber unit in accordance with the HDLC (High-level Data Link Control) procedures in compliance with the recommendation T.30 of the ITU-T. The subscriber unit detects the preamble signal, and carries out a connecting process for switching the connection with the base station to the facsimile mode (TCP/IP-PPP setting).

In the following communication, the control unit of the subscriber unit controls the modem of the base station, while the control unit of the base station controls the modem of the subscriber unit by commands such as AT commands. Here, the communication between the subscriber unit and the base station is carried out with digital signals, while the communication between the subscriber unit and the reception facsimile machine, and the communication between the base station and the caller facsimile machine are carried out with modulation signals. After transmitting the first preamble signal and the initial connection information, the reception facsimile machine transmits a second preamble signal and initial connection information, because there is no response from the caller facsimile machine. In accordance with the recommendation T.30 of the ITU-T, the transmission should be repeated for 35±5 seconds until receiving a response from the other side.

The subscriber unit detects the second preamble signal, and transmits the detection result in the form of an AT command or the like to the modem of the base station in the WLL system. The base station then transmits the same signal as the signal transmitted from the reception facsimile machine to the caller facsimile machine.

In response to the signal transmitted from the base station, the caller facsimile machine returns signals in compliance with the recommendation T.30 of the ITU-T. The modem of the base station detects the signal transmitted from the caller facsimile machine, and transmits a command such as an AT command to the modem of the subscriber unit in the WLL system. The subscriber unit then transmits the same signal as the signal transmitted from the caller facsimile machine to the reception facsimile machine. The rest of the operation is the same as in the facsimile communication connection on the general public line network.

Figure 17:
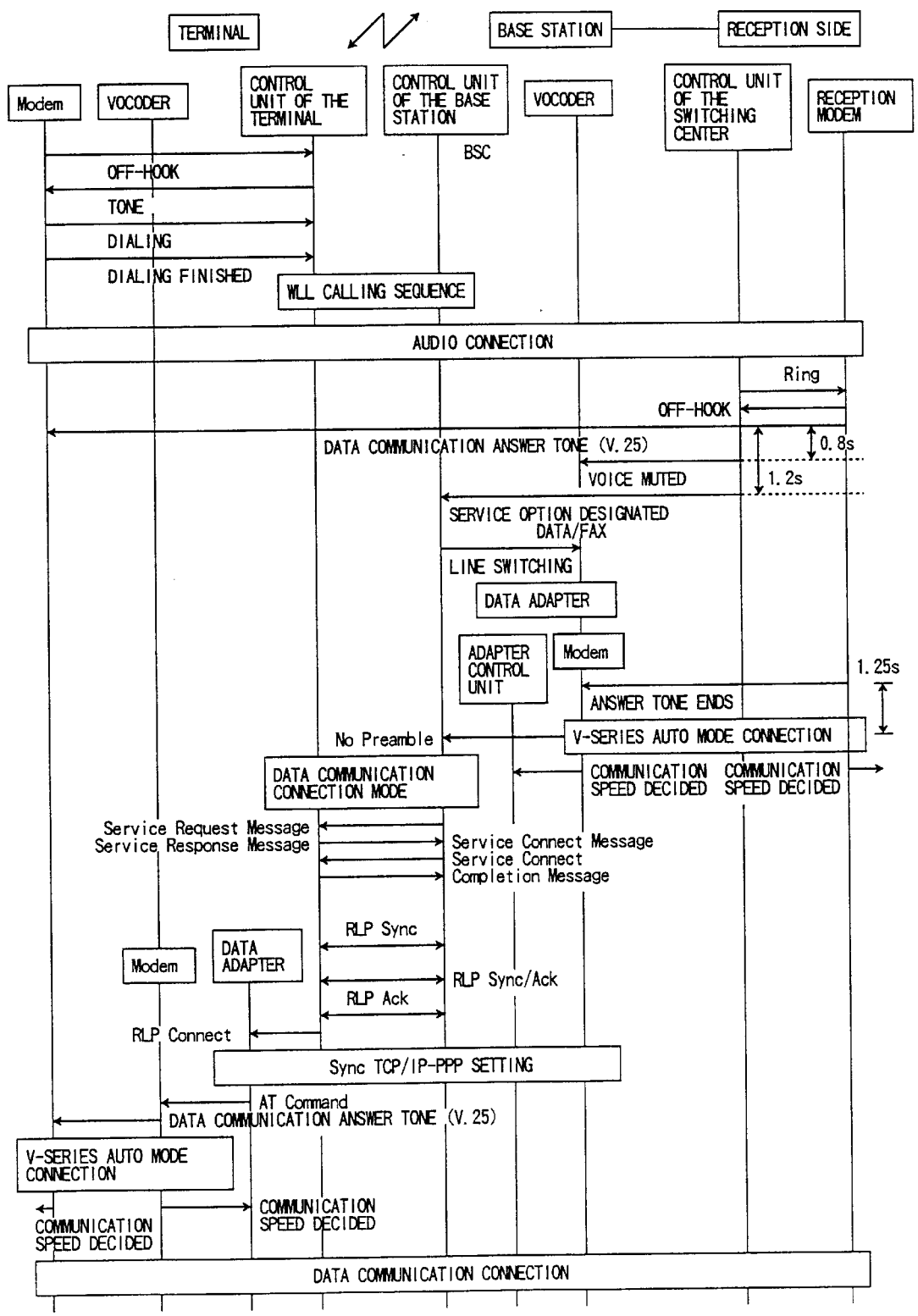
FIG. 17 is a sequence diagram of one embodiment of a data communication process in accordance with the present invention.

Referring now to FIG. 17, a specific example of a data communication process will be described below. In this example, a call is made from a modem connected to a subscriber unit to a modem connected to the general public line network. FIG. 17 is a sequence diagram of one embodiment of the data communication process.

As the modem connected to the subscriber unit dials the number of the destination modem, a WLL calling sequence is carried out between the subscriber unit and the base station, so that the caller modem and the reception switching center are put in an audio-connected state.

The reception switching center receives a call from or makes a call to the reception modem, and the reception modem automatically carries out off-hook. After the off-hook, the reception modem transmits an answer tone in compliance with the V-series recommendation of the ITU-T. Detecting the answer tone, the base station stops (or mutes) the vocoder, and switches the communication line from the vocoder side to the modem side.

When the answer tone ends, the reception modem starts a modem response in compliance with the V-series recommendation of the ITU-T. Here, the reception modem confirms that no preamble signal specified in the recommendation T.30 of the ITU-T is detected within 1.25 seconds after the end of the answer tone, and determines the connection to be a modem connection. The base station then carries out a connection process for switching the connection with the subscriber unit to the data communication mode (TCP/IP-PPP setting).

In the following communication, the control unit of the subscriber unit controls the modem of the base station, while the control unit of the base station controls the modem of the subscriber unit with commands such as AT commands. Here, the communication between the subscriber unit and the base station are carried out with digital signals, while the communication between the subscriber unit and the caller facsimile machine, and the communication between the base station and the reception facsimile machine are carried out with modulated signals.

The subscriber unit transmits the same answer tone as the answer tone transmitted from the reception modem to the modem connected to the subscriber unit, and carries out a spurious connection process with the reception modem in accordance with the V-series recommendation of the ITU-T. The rest of the operation is the same as in the data communication connection on the general public line network.

Figure 18:
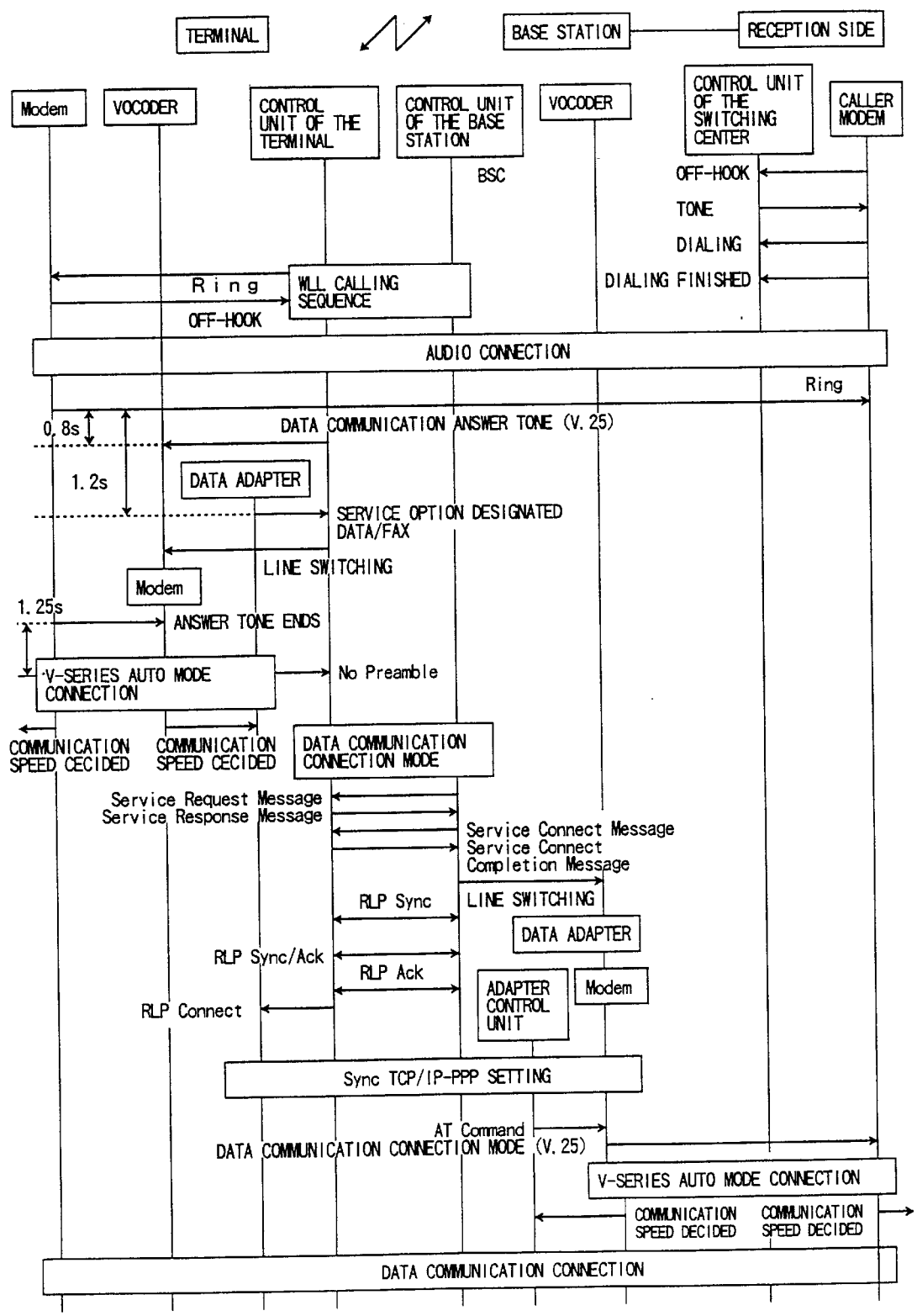
FIG. 18 is a sequence diagram of another embodiment of a data communication process in accordance with the present invention.

Referring now to FIG. 18, another specific example of a data communication process will be described below. In this example, a call is made from a modem connected to the general public line network to a modem connected to a subscriber unit. FIG. 18 is a sequence diagram of one embodiment of the data communication process.

As the modem connected to the general public line network dials the number of the destination modem, a WLL calling sequence is carried out between the base station and the subscriber unit, so that the caller modem and the subscriber unit are put in an audio-connected state.

The subscriber unit receives a call from or makes a call to the reception modem, and the reception modem automatically carries out off-hook. After the off-hook, the reception modem transmits an answer tone in compliance with the V-series recommendation of the ITU-T. Detecting the answer tone, the subscriber unit stops (or mutes) the vocoder, and switches the communication line from the vocoder side to the modem side.

When the answer tone ends, the reception modem starts a modem response in compliance with the V-series recommendation of the ITU-T. Here, the reception modem confirms that no preamble signal specified in the recommendation T.30 of the ITU-T is detected within 1.25 seconds after the end of the answer tone, and determines the connection to be a modem connection. The subscriber unit then carries out a connection process for switching the connection with the base station to the data communication mode (TCP/IP-PPP setting).

In the following communication, the. control unit of the subscriber unit controls the modem of the base station, while the control unit of the base station controls the modem of the subscriber unit with commands such as AT commands. Here, the communication between the subscriber unit and the base station are carried out with digital signals, while the communication between the subscriber unit and the caller facsimile machine, and the communication between the base station and the reception facsimile machine are carried out with modulated signals.

The base station transmits the same answer tone as the answer tone transmitted from the reception modem to the modem connected to the switching center, and carries out a spurious connection process with the reception modem in accordance with the V-series recommendation of the ITU-T. The rest of the operation is the same as in the data communication connection on the general public line network.

As described so far, the WLL system of the present invention can automatically switch the communication mode in accordance with the type of a signal inputted into the wireless system. Also, with the WLL system of the present invention, a subscriber can use telephone, facsimile, and computer, without taking trouble to switch the communication mode.

The present invention is not limited to the specifically disclosed embodiments, but variations and modifications may be made without departing from the scope of the present invention.

The present application is based on Japanese priority application No. 11-225289, filed on Aug. 9, 1999, the entire contents of which are hereby incorporated by reference.

What is claimed is:

1. A base station comprising:
   a tone detecting unit that detects a type of a signal inputted from a general public line network;
   a signal path switching unit that switches a signal path between an audio signal path and a data signal path;
   a control unit that controls the signal path switching unit based on the detected type of the signal; and
   a communication unit that is wirelessly connected to a subscriber's home;
   wherein a data signal is a facsimile signal or a data communication signal, the signal path switching unit selects the audio signal path as an initial state, and the signal path switching unit selects the data signal path when a tone indicating a facsimile signal or a data communication signal is detected in the base station.

2. The base station as claimed in claim 1, wherein the data signal path lacks a vocoder that carries out a high compression audio signal encoding process.

3. The base station as claimed in claim 1, wherein the signal path switching unit selects a facsimile signal path from the data signal path when a preamble signal is detected within a predetermined period of time after a normal called station identifying signal is generated, regardless of whether a calling tone is detected or not, and wherein the signal path switching unit selects a data communication signal path from the data signal path when no preamble signal is detected within the predetermined period of time.

4. A base station comprising:
   a tone detector that detects a type of a signal inputted from a general public line network;
   a selector that switches a signal path between an audio signal path and a data signal path;
   a controller that controls the selector based on the detected type of the signal; and
   an RF block unit that is wirelessly connected to a subscriber's home;
   wherein the data signal is a facsimile signal or a data communication signal, the selector selects the audio signal path as an initial state, and the selector selects the data signal path when a tone indicating a facsimile signal or a data communication signal is detected in the base station.

5. A wireless system comprising:
   a subscriber terminal that is connected to a device that outputs an audio signal or a data signal, and switches a signal path between an audio signal path and a data signal path based on a type of a signal inputted from the device; and
   a base station that switches a signal path between an audio signal path and a data signal path based on a type of a signal inputted from a general public line network,
   wherein the subscriber terminal is wirelessly connected to the base station, the data signal is a facsimile signal or a data communication signal, the base station selects the audio signal path as an initial state, and the base station selects the data signal path when a tone indicating a facsimile signal or a data communication signal is detected at the base station.

6. The wireless system as claimed in claim 5, wherein the subscriber terminal and the base station each comprise a selector that selects the audio signal path as an initial state, and the selector selects the data signal path when a tone indicating a data signal is detected in the subscriber terminal or the base station.

7. The wireless system as claimed in claim 6, wherein:
   the selector selects a facsimile signal path from the data signal path when a preamble signal is detected within a predetermined period of time after a normal called station identifying signal is generated, regardless of whether a calling tone is detected or not; and
   the selector selects a data communication path from the data signal path when no preamble signal is detected within the predetermined period of time.

8. The wireless system as claimed in claim 6, wherein:
   the data signal is a facsimile signal;
   the selector selects a facsimile signal path from the data signal path when a preamble signal is detected within a predetermined period of time after a normal called station identifying signal is generated, regardless of whether a calling tome is detected or not; and an error is detected and the signal path is cut off when no preamble signal is detected within the predetermined period of time.

9. A communication mode switching method, comprising the steps of:

selecting an audio signal path as an initial state from signal paths of a subscriber terminal and a base station;

detecting a type of signal inputted into the subscriber terminal and the base station;

switching the signal path between the audio signal path and a data signal path based on the detected type of the signal; and carrying out wireless communication between the subscriber terminal and the base station via the switched signal path, wherein the data signal is a facsimile signal or a data communication signal, and in said switching step, the data signal path is selected when a tone indicating a facsimile signal or a data communication signal is detected in the subscriber terminal or the base station.

10. A subscriber terminal comprising:

a connecting unit to which a device for outputting an audio signal or a data signal is connected;

a tone detecting unit that detects a type of a signal inputted through the connecting unit;

a signal path switching unit that switches a signal path between an audio signal path and a data signal path;

a control unit that controls the signal path switching unit based on the detected type of the signal; and a communication unit that is wirelessly connected to a general public line network;

wherein the data signal is a facsimile signal or a data communication signal, the signal path switching unit selects the data signal path when a tone indicating a facsimile signal or a data communication signal is detected in the subscriber terminal, wherein the signal path switching unit selects a facsimile signal path from the data signal path when a preamble signal is detected within a predetermined period of time after a normal called station identifying signal is generated, regardless of whether a calling tone is detected or not, and wherein the signal path switching unit selects a data communication signal path from the data signal path when no preamble signal is detected within the predetermined period of time.

* * * * *